United States Patent [19]

Meiser

[11] 3,816,232

[45] June 11, 1974

[54] DECORATED MOLDED ARTICLE AND METHOD OF PRODUCING IT

[75] Inventor: Kenneth D. Meiser, Dallas, Tex.

[73] Assignee: Plastics Manufacturing Company, Dallas, Tex.

[22] Filed: Feb. 28, 1973

[21] Appl. No.: 336,411

Related U.S. Application Data

[63] Continuation-in-part of Ser. Nos. 826,694, May 21, 1969, abandoned, and Ser. No. 157,011, June 25, 1971, abandoned.

[52] U.S. Cl............... 161/146, 156/277, 156/331, 161/258, 161/259, 161/263, 161/413
[51] Int. Cl............................................. B32b 27/10
[58] Field of Search .......... 161/146, 258, 259, 263, 161/264, 413; 156/63, 277, 331, 335; 162/134, 166, 167

[56] References Cited
UNITED STATES PATENTS

| | | | |
|---|---|---|---|
| 3,035,966 | 5/1962 | Siuta | 162/166 |
| 3,067,077 | 12/1962 | Latella | 161/413 X |
| 3,316,204 | 4/1967 | Lederer | 162/166 X |
| 3,421,967 | 1/1969 | Hochner | 161/413 X |
| 3,451,878 | 6/1969 | Fung | 162/134 X |
| 3,537,950 | 11/1970 | Hale | 161/258 |

*Primary Examiner*—Marion E. McCamish
*Attorney, Agent, or Firm*—Marshall & Yeasting

[57] ABSTRACT

A decorated molded article is produced by preparing an assembly including a molding composition comprising a cellulose filler, a surface sheet of unpigmented paper, and an underlying sheet of paper, both of said sheets and the cellulose filler being impregnated with 1 ½ to 3 times their weight of thermosetting melamine-formaldehyde resin. A decorated sheet of a dense, filled paper unimpregnated with resin is interposed between the surface sheet and the underlying sheet, and the assembly is consolidated under heat and pressure to bond it into a decorated article of excellent quality.

4 Claims, No Drawings

DECORATED MOLDED ARTICLE AND METHOD OF PRODUCING IT

CROSS-REFERENCE TO RELATED APPLICATIONS

This is a continuation-in-part of application Ser. No. 826,694 filed May 21, 1969, now abandoned, and application Ser. No. 157,011 filed June 25, 1971, now abandoned.

BACKGROUND OF THE INVENTION

In the known method of producing decorated molded articles by forming under heat and pressure, the top surface of the article customarily consists of a sheet of paper impregnated with a thermosetting melamine-formaldehyde reaction product.

If the impregnated surface sheet in a decorated molded article produced by the known method is made from substantially pure cellulose and is unpigmented, it is substantially transparent in the finished article. Such an impregnated surface sheet usually is printed on the underside of the sheet with a design which provides the decoration and is clearly visible in the finished article through the transparent surface sheet.

The melamine-formaldehyde reaction product with which the surface sheet is impregnated, which is present in an amount ranging from 100 to 300 percent of the initial weight of the paper sheet, causes considerable difficulty in the operation of printing a design upon the impregnated sheet. For example, the reaction product with which the paper is impregnated prevents the surface of the sheet from taking the ink uniformly, so that the color of the printed area is not uniform, and along the edge of the printed area the ink tends to wick out into the unprinted area. If a heavy ink, having a high resin content, is used in an attempt to produce a printed area of uniform color on a sheet of paper which has been impregnated with a thermosetting melamine-formaldehyde reaction product, the heavy application of ink may cause blistering to occur when the molded article is being formed under heat and pressure.

Another difficulty in printing paper which has been impregnated with a thermosetting melamine-formaldehyde reaction product is that the impregnated paper is relatively brittle so that corners of the sheets may break off during the printing operation.

A further disadvantage of the sheets impregnated with a thermosetting reaction product and printed with a design which are used in this known method is that the thermosetting reaction product with which the sheets are impregnated gradually deteriorates in storage, so that the printed impregnated sheets have a limited shelf life. Thus this method is uneconomical in that each design must be printed upon the impregnated sheets in a relatively short run, to produce a small supply of the printed impregnated sheets which can be used up over a relatively short period of time in producing the molded articles, and it is not possible to print a large quantity of the impregnated sheets to be stored and used over an extended period of time.

U.S. Pat. No. 3,537,950, which relates to decorated laminates rather than decorated molded articles, discloses a process of producing a laminate in which a sheet of highly porous, highly absorbent paper is printed with a design and is incorporated in the laminate immediately beneath the transparent surface sheet. However, this patent discloses that a critical characteristic of the decorated paper sheet used in the process is high porosity and high absorbency. The high porosity and absorbency of the decorated paper sheet used in the process disclosed in this patent makes it impossible to use a water-base ink in printing a design upon the paper sheet, because a water-base ink soaks into such a porous, absorbent sheet and cannot be used to print a clean-cut design.

In printing the highly porous, highly absorbent decorated sheet used in the process disclosed in U.S. Pat. No. 3,537,950, it is necessary to use a relatively heavy ink, having a high resin content, which will not soak into the porous, absorbent paper sheet. Such a heavy ink tends to cause blistering when the article is formed under heat and pressure. The heavy inks which it is necessary to use in printing the porous, absorbent sheet of paper can be used in producing a laminate, which is heated and subsequently cooled rather slowly in the forming operation, while it is held under pressure for a relatively long period of time. However, a heavy ink which must be used in printing a porous, absorbent paper would not give satisfactory results in the production of a molded article, because a molded article is heated quickly to a high temperature and is held under pressure for a relatively short period of time so that a heavy ink used for printing a decorated sheet would be much more likely to cause blistering.

Another disadvantage of the highly porous and absorbent paper which it was necessary to use in the process disclosed in U.S. Pat. No. 3,537,950 was that such highly porous and absorbent paper is too limp to be handled in the normal manner for rotogravure or offset printing. In the process described in that patent, in order to permit the decorated paper sheet to be printed in the normal manner, using conventional printing apparatus, it was necessary to impregnate the sheet with about 3–10 percent of its weight of resin.

SUMMARY OF THE INVENTION

The principal object of the invention is the production of a novel decorated molded article by a method in which the decoration is printed upon a sheet of dense, filled paper which can be cleanly printed with a water-base ink and which is unimpregnated with resin.

The dense, filled paper, unimpregnated with resin, the use of which is made possible by the present invention, can be printed in the normal manner using conventional printing apparatus, using a water-base ink, to produce a cleanly printed design, with no wicking out along the edges of the printed area. By making it possible to use a water-base ink, the present invention completely eliminates the problem of blistering of molded articles.

The present invention is based upon the discovery that it is possible to use a decorated sheet of a dense, filled paper unimpregnated with resin to produce a decorated article of excellent quality by consolidating under heat and pressure, provided that certain critical conditions are observed. These critical conditions are that the decorated sheet must be incorporated in an assembly consisting of a surface sheet of unpigmented paper, on top of the decorated sheet, another sheet of paper underlying the decorated sheet, and a body portion consisting of a molding composition comprising a cellulose filler, and that the surface sheet, the underlying sheet and the cellulose filler must be impregnated with 1½ to 3 times their weight of thermosetting melamine-formaldehyde resin. Consolidation of such an assembly under heat and pressure produces a decorated article of excellent quality in which the decorated sheet is bonded between the surface sheet and the underlying sheet.

DECORATED SHEET

The paper sheet which is to be printed with a design or otherwise decorated is a dense, filled sheet of paper unimpregnated with resin.

The density, porosity or absorbency of paper sheets is measured by means of a "densometer" in accordance with standard T.A.P.P.I. specification No. T460-OS-68, which measures the rate of diffusion of air through paper sheets under standard conditions.

The preferred paper for the decorated sheet in the practice of the present invention is ordinary bond paper of a weight from 13 lbs. to 16 lbs., which is equivalent to about 4 to 5 grams per square foot.

Ordinary bond paper usually is from 0.002 to 0.006 inch in thickness and weighs from 4 to 6 grams per square foot per 0.003 inch of thickness. Bond paper is considered to be a dense paper of low absorbency. Thus when tested by the densometer test described above, a single sheet of 13 lb. bond paper takes 69 seconds to pass 300 cc of air. In contrast, the highly absorbent, highly porous paper which it was necessary to use in the process disclosed in U.S. Pat. No. 3,537,950 was shown by the densometer test to be so absorbent and porous that it took only 7–12 seconds for 300 cc of air to pass through 5 sheets of the paper. The absorbent paper which was used in that process weighed 28 to 30 lbs. per 3,000 square feet, and had a caliper thickness of 0.0049 inch, whereas ordinary 13 lb. bond paper weighs 32 to 33 lbs. per 3,000 square feet and has a caliper thickness of only 0.003 inch. Thus the bond paper used in the practice of the present invention for the decorated sheet is not only much less porous and much less absorbent but also much more dense than the highly absorbent paper which it was necessary to use in the process disclosed in U.S. Pat. No. 3,537,950.

Ordinary bond paper may be made from 85 percent hard wood and 15 percent soft pine. In order to prevent bleeding of highly fluid, water-base inks, bond paper has its surface filled with clay and pigment such as titanium dioxide, and sealed with a starch sealer.

A dense, filled paper, unimpregnated with resin, such as ordinary bond paper, which is used in the practice of the present invention, can be printed with clean-cut designs by means of a fluid, water-base ink which cannot cause blistering of molded articles. In contrast, a highly absorbent paper would absorb a fluid, water-base ink like a blotter, and can be printed only with a heavy ink having a high resin content, which tends to cause blistering and poor bonding in a molded article.

Although ordinary bond paper is preferred for use as the decorated paper sheet in the practice of the present invention, any dense, filled paper which is unimpregnated with resin may be used. Sulfite or rag paper is preferred. For best results, the paper should be unsized or only slightly sized. The paper used for the decorated sheet may be either pigmented or unpigmented, depending upon the appearance desired, and depending upon whether or not it is desired to hide the underlying material.

The ink used for decorating the paper preferably is a stencil-type ink having a low resin content, or a water-base ink. Such inks have a low viscosity, and the dense, filled paper used in the practice of the invention takes these inks uniformly, so that it is not necessary to use a heavy ink in order to obtain a uniform color.

PREPARATION OF IMPREGNATED SHEETS

The surface sheet which is used in producing a decorated molded article in accordance with the invention consists of unpigmented paper impregnated with 1½ to 3 times its weight of a thermosetting melamine-formaldehyde resin. The paper used for impregnation with a thermosetting resin preferably consists of substantially pure cellulose. For example, the paper may consist of 100 percent alpha cellulose fiber, or it may consist of a mixture of alpha cellulose fiber and rayon fiber, the proportion of each fiber usually being between 40 and 60 percent by weight.

The additional sheet of paper, impregnated with a thermosetting melamine-formaldehyde resin, which is interposed between the decorated paper sheet and the resin-impregnated cellulose filler in accordance with the invention may be made of any desired material which can be impregnated with the thermosetting resin.

In the impregnation of a paper sheet which is to be used as the surface sheet or as an additional sheet interposed beneath the decorated paper sheet, the thermosetting resin preferably is applied in the form of an aqueous solution. The concentration of the impregnating solution may be any concentration which makes it possible to impart the desired amount of the resin to the paper by an impregnating operation. Ordinarily the concentration of an aqueous solution of the resin is from about 30 to about 70 percent solids.

A solution of the thermosetting resin may be used to impregnate the paper in the usual manner. A continuous web of paper may be fed from a supply roll, and may be impregnated by means of coating rolls, or by passing it beneath the surface of the solution. Preferably the paper is initially impregnated by means of rolls and then is passed through the solution.

An aqueous solution of a melamine-formaldehyde reaction product for use in impregnating the paper may be prepared by dissolving melamine in a commercial 37 percent aqueous formaldehyde solution to which a base such as sodium hydroxide has been added if necessary so that the pH after the solution has been heated to 180°F to dissolve the melamine is from about eight to about nine. The molar proportion of formaldehyde to melamine may be between 1:1 and 2.5:1, but preferably is from 2.0:1 to 2.2:1. Unless the proportion of formaldehyde to melamine is relatively high, it may be necessary to add water to the commercial aqueous formaldehyde solution in order to permit the melamine to dissolve, the amount of water added being such that the addition of the melamine produces a solution containing from about 45 to about 60 percent solids. In calculating the solids content of the solution, it is assumed that 1 mol of water is split off during the reaction for every three mols of formaldehyde. The solution is refluxed until the reaction has progressed far enough so that the solution will remain clear and stable upon cooling to 70°F. Before the solution is used to impregnate a sheet of paper, the pH is brought to a value from about 6.5 to about 8 by addition of an acidic material, for example an organic acid such as lactic acid.

Paper which has been impregnated with a solution thus prepared may be dried by exposing it to circulating air at about 270°F for about 1 minute.

In the impregnated paper used in the practice of the present invention, the amount of the thermosetting resin is from about 1½ to about 3 times the initial weight of the paper. It is preferable that the paper be impregnated with at least twice its weight of the resin. However, paper which is impregnated with more than three times its weight of the resin is quite brittle and difficult to handle.

The weight of the paper which is to be impregnated with the resin is not critical. However, the unpigmented paper which is impregnated to form the surface sheet preferably is about 0.004 inch or more in thickness and weighs at least 4 grams per square foot. A resin-impregnated sheet which underlies the decorated sheet of paper may be even thinner than the surface sheet. However, a thinner sheet must be handled with greater care in order to avoid tearing it during the impregnating operation.

The initial weight per square foot of the paper which is impregnated to produce the surface sheet preferably is at least as great as the weight per square foot of the decorated paper sheet, in order that the surface sheet may carry a sufficient amount of resin so that the molded article has maximum surface luster.

The weight of the paper which is impregnated to produce the surface sheet may be 10 grams or more per square foot, depending upon the surface appearance desired in the molded article. When paper having a weight of 4 to 5 grams per square foot is impregnated with a melamine-formaldehyde resin to produce the surface sheet, the resulting surface sheet in the molded article is transparent and is scarcely visible, except that it imparts a glossy appearance to the design which appears on the upper surface of the underlying decorated paper sheet. If the surface sheet is made from heavier paper, it imparts an appearance of greater depth to the design in the molded article, but the design may be less distinct.

The weight of an additional resin-impregnated paper sheet underlying the decorated paper sheet preferably is at least as great as the weight of the paper which forms the decorated sheet.

MOLDING COMPOSITION

In the practice of the invention, the molded article includes a molding composition consisting of a finely divided cellulose filler impregnated with a melamine-formaldehyde resin.

For example, a solution of a melamine-formaldehyde reaction product which is the same as the solution used to impregnate the surface sheet may be employed to impregnate bleached sulfite pulp, or any other cellulosic filler. The dried impregnated filler, which preferably contains about 60 to 75 percent by weight of the formaldehyde-melamine reaction product and from about 25 to 40 percent of cellulose, is ground to a fine powder, together with modifiers such as pigments, zinc stearate or other lubricants, and phthalic anhydride or other acidic materials which serve as curing catalysts.

The amount of a finely divided molding composition which is required to produce the decorated molded article preferably is compressed into a solid preform, for ease of handling.

EXAMPLE 1

A design was printed upon ordinary bond paper, having very little sizing and having a thickness of 0.003 inch and a weight of approximately 4 grams per square foot, corresponding to the weight of 13 lb. bond paper.

A surface sheet was prepared by impregnating a sheet of alpha cellulose paper with an aqueous solution of melamine-formaldehyde reaction product prepared as hereinbefore described. Before impregnation, the alpha cellulose paper was 0.0045 inch thick and weighed 4.4 grams per square foot. After impregnation, the surface sheet was dried at 270°F for about 1 minute. The dried impregnated surface sheet was approximately 0.007 inch thick and consisted of 31 percent by weight of alpha cellulose and 69 percent by weight of melamine-formaldehyde reaction product. In order to determine the fusibility and flowability of the melamine-formaldehyde reaction product, samples of the dried impregnated surface sheets were subjected to a standard test in which eight or nine sheets were pressed together at about 300°F for about 2 minutes, and the flash surrounding the resulting laminate was then broken off and weighed. The weight of the flash was between 6 and 12 percent of the total weight of each laminated piece including the flash.

The sheet of unimpregnated printed paper and two sheets of the impregnated alpha cellulose paper were then used in producing a dinner plate. Each of the sheets used was circular in shape, and had a diameter slightly less than the diameter of the final dinner plate. A finely divided commercial alpha cellulose-filled melamine-formaldehyde molding composition, in an amount sufficient to produce a dinner plate, was consolidated under pressure into a preform, was preheated, and was placed between the dies which were to be used to form the dinner plate. The dies were at a temperature of 315°F, and they were closed upon the preform under a pressure of about 3,000 lbs. per square inch, and were held closed under that pressure for 45 seconds. The dies were then opened, and a sub-assembly of the sheets consisting of the unimpregnated printed sheet with the printed side uppermost, between two impregnated sheets, was placed on top of the molding composition. The dies were then immediately closed to hold the assembly under the same pressure and temperature for 80 seconds. The dies were then opened and the dinner plate was ejected.

A control dinner plate was molded by a procedure which was the same in all respects except that only one sheet of the impregnated paper was used, and the other impregnated sheet and the decorated unimpregnated sheet were omitted.

Examination of the dinner plate which included the printed sheet of paper showed that the impregnated surface sheet was substantially completely transparent, so that the decorated upper surface of the underlying sheet was very clearly visible. The transparent surface sheet imparted a glossy sheen which enhanced the appearance of the design which had been printed upon the underlying sheet. When this dinner plate was compared with the control dinner plate, no difference in the surface luster of the two dinner plates could be detected upon careful inspection.

Pieces cut from each of the two dinner plates were tested by immersing them in a test bath which had been prepared by adding instant coffee to water in an amount equal to 96 grams per gallon of water. The test bath containing the test pieces was held at a temperature of 180°F for 48 hours, and the test pieces were then removed from the bath, rinsed with water and dried. The results of the test were determined by measuring the degree of staining of the laminated surface of each test piece, by comparing the reflectance for blue light (474 mu) of the laminated surface of each test piece with the reflectance of the laminated surface of the untested remainder of the dinner plate, using a Bausch and Lomb spectrophotometer (Spectronic No. 20). No appreciable difference was found between the degree of staining of the test piece containing the printed decorated sheet and that of the test piece cut from the control dinner plate.

The conventional procedure for manufacturing decorated dinner plates is the same as the procedure used in this example for producing the control dinner plate. In the conventional procedure, a design is printed on the underside of the sheet of dried impregnated alpha cellulose paper, and the dried impregnated sheet of alpha cellulose paper is relatively brittle and is liable to be damaged in the printing operation or in handling. Also, it is impossible to obtain perfectly uniform impregnation, so that the dried impregnated sheet does not take the ink uniformly. If a heavy ink is used in the conventional procedure in order to obtain a uniform color in the design, the heavy coating of ink is liable to cause blistering during the operation of forming the decorated plate under heat and pressure. Also, a cleanly printed design cannot be obtained when an impregnated sheet of paper is used, because the ink tends to wick outward at the edges of the inked areas. The stability of the resin with which the paper is impregnated is limited, and the number of impregnated sheets which are printed in each run must be small enough so that the resulting supply of printed impregnated sheets can be used up over a relatively short period of time in the manufacture of decorated dinner plates.

This example demonstrated that excellent results can be obtained by printing the desired design upon ordinary bond paper instead of printing the design upon the underside of the resin-impregnated sheet which is used to form the surface of the dinner plate. The unimpregnated bond paper is dense, filled and substantially non-absorbent so that it takes the ink uniformly, and there is no wicking out of the ink at the edges of the printed areas. Also, a large quantity of sheets of unimpregnated paper can be printed in a single long run, at much less cost than printing a relatively small number of sheets periodically in a series of short runs, because the sheets of printed unimpregnated paper can be stored indefinitely. In most cases, a design is printed in several colors, so that the good printability and non-brittle nature of the unimpregnated sheet which is used in the practice of the present invention is particularly important.

EXAMPLE 2

A dinner plate embodying the invention was produced as described in Example 1, except that the paper upon which the design was printed was 16 lb. bond paper, weighing approximately 5 grams per square foot. When this dinner plate was compared with the control dinner plate, no difference in the surface luster of the two dinner plates could be detected upon careful inspection. There was no appreciable difference between the degree of staining of a test piece cut from this dinner plate and the test piece cut from the control dinner plate. There was no difference in the quality of the dinner plate embodying the invention produced in accordance with this example and the dinner plate embodying the invention produced in accordance with Example 1.

EXAMPLE 3

The procedure of Example 2 was repeated several times, using progressively heavier grades of bond paper to receive the printed design in order to produce a series of dinner plates. In the dinner plates so produced, the surface sheet was well bonded to produce integral dinner plates, but the surface luster of the dinner plates so produced was slightly less than that of the dinner plates produced in Examples 1 and 2. Also, the degree of staining in coffee solution of test pieces cut from the dinner plates produced in accordance with this example was slightly greater than the degree of staining of the test pieces cut from the dinner plates produced in Examples 1 and 2. The maximum weight of the paper used for the decorated sheet in this example was 25 grams per square foot.

I claim:

1. A method of producing a decorated molded article that comprises the steps of (1) preparing an assembly including a molding composition comprising a cellulose filler, and a surface sheet of unpigmented paper, both the surface sheet and the cellulose filler being impregnated with 1½ to 3 times their weight of thermosetting melamine-formaldehyde resin, and (2) consolidating the assembly under heat and pressure, wherein the improvement comprises the step of including in the assembly, between the surface sheet and the molding composition, a decorated sheet of a filled paper unimpregnated with resin, and an underlying sheet of paper impregnated with 1½ to 3 times its weight of thermosetting melamine-formaldehyde resin, whereby the assembly, upon application of heat and pressure, is bonded to form a decorated article of excellent quality, the decorated sheet having a low enough absorbency to prevent wicking of water-base inks, and being a high density paper stock weighing at least 4 grams per square foot per 0.003 inch of caliper thickness.

2. A method according to claim 1 wherein the decorated sheet is bond paper.

3. A decorated molded article consisting of a heat- and pressure-consolidated assembly including a molding composition comprising a cellulose filler, a substantially transparent surface sheet of unpigmented paper, and an underlying sheet of paper, both of said sheets and the cellulose filler being impregnated with 1½ to 3 times their weight of a thermoset melamine-formaldehyde resin, and a decorated sheet of a filled paper bonded between the surface sheet and the underlying sheet, said decorated sheet being a high density paper stock weighing at least 4 grams per square foot per 0.003 inch of caliper thickness and having a low enough absorbency to prevent wicking of water-base inks.

4. A decorated molded article according to claim 3 wherein the decorated sheet is bond paper.

* * * * *